No. 742,213. PATENTED OCT. 27, 1903.
J. F. McCULLUM.
FASTENER FOR TOOL HANDLES.
APPLICATION FILED DEC. 12, 1902.
NO MODEL.

Witnesses
B. Patterson
D. W. Hagues

Inventor
J. F. McCullum
By his Attorneys
Clark Deemer & Co.

THE NORRIS PETERS CO., PHOTO-LITHO., WASHINGTON, D. C.

No. 742,213. Patented October 27, 1903.

UNITED STATES PATENT OFFICE.

JAMES FREDERICK McCULLUM, OF NEW YORK, N. Y.

FASTENER FOR TOOL-HANDLES.

SPECIFICATION forming part of Letters Patent No. 742,213, dated October 27, 1903.

Application filed December 12, 1902. Serial No. 134,906. (No model.)

*To all whom it may concern:*

Be it known that I, JAMES FREDERICK MC-CULLUM, a citizen of the United States, and a resident of New York, county of New York, and State of New York, have invented certain new and useful Improvements in Fasteners for Tool-Handles, of which the following is a specification, reference being had to the accompanying drawings, forming a part thereof, in which similar letters of reference indicate corresponding parts.

This invention relates to improvements in fasteners for tool-handles, and especially of that class of tools in which there is a handle secured in an eye—such as hammers, axes, hatchets, and tools of a similar character.

The invention has for its object to provide a means for securely fastening handles in tools of the said character.

The invention also has for its object to provide a clamping device which engaging the outer edge of the eye of said tool and being clamped in the handle thereof effectually prevents its withdrawal therefrom.

The invention also has divers other objects which will be fully hereinafter set forth.

The nature of the invention consists in the combination, with the handle and eye of a tool of said character, of a resilient loop so bent that while it rests on the outer edge of the said eye it also extends to and is clamped in the handle of said tool to prevent the withdrawal of said handle.

The invention also consists in the combination, with the handle and eye of a tool of the character aforesaid, of a resilient loop bent, formed, and arranged so that while one end engages the outer edge of said eye the other parts of said loop passing through said eye and extending up on the handle of said tool clamp in such handle and are held in position by interlocking serrated edges, so that it will effectually prevent the said handle from being withdrawn from said eye.

The invention also consists in divers other novel features which will be fully understood from the following general description and the annexed drawings and will be subsequently pointed out in the claims.

Figure 1:
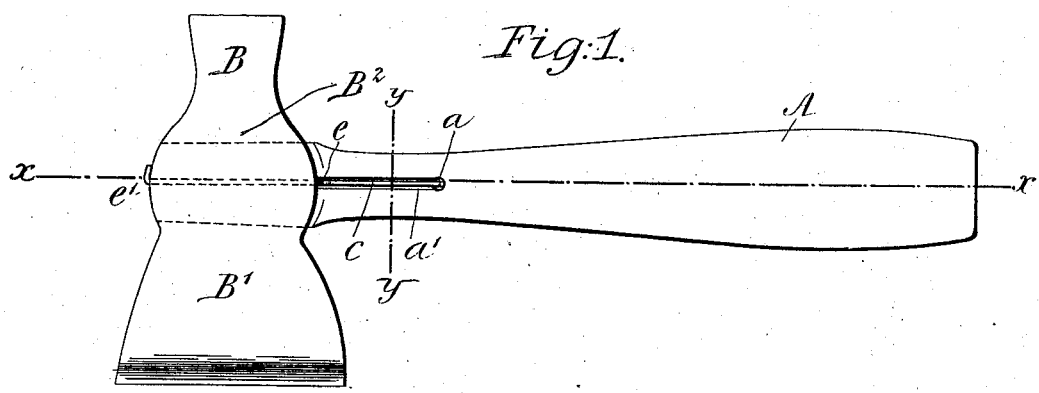
Figure 2:
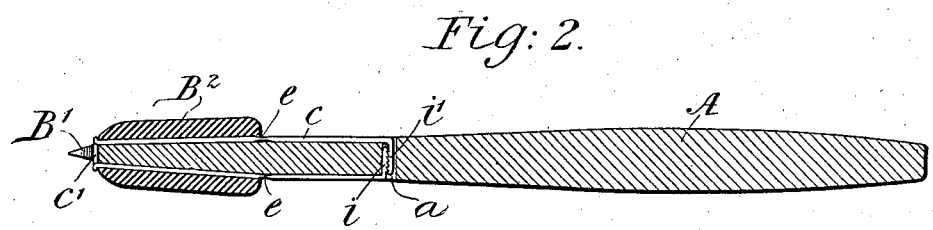
Figure 3:
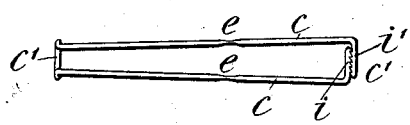
Figure 4:
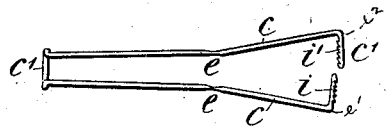
Figure 5:
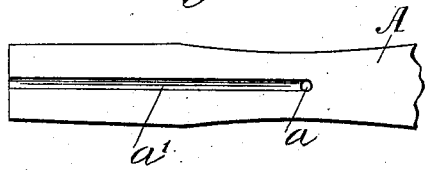
Figure 6:
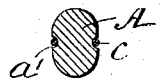
Figure 7:
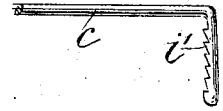

In the annexed drawings, which are hereby made a part of this specification, Figure 1 is a side view of a hatchet with my newly-invented device attached. Fig. 2 is a sectional view of the same, taken on the line $xx$ of Fig. 1. Fig. 3 is a view of the clamping-loop closed. Fig. 4 is a view of the clamping-loop open. Fig. 5 is a view of the handle of the hatchet prepared for the clamping-loop. Fig. 6 is a transverse sectional view of the hatchet-handle, taken on the line $yy$ of Fig. 1. Fig. 7 is a detailed view more fully hereinafter described.

In the example of my invention here given I have illustrated it as applied to an ordinary carpenter's hatchet.

In Fig. 1, A designates the handle, B the pole, B' the blade, and $B^2$ the eye, of the hatchet. The handle A, which is to be otherwise of the common form, is channeled with grooves $a'$ on directly opposite sides extending from its smaller end to the hole $a$. This hole passes entirely through the handle at right angles to the axis thereof and communicates with both of said grooves.

C C' designates a resilient loop formed with the bend C' and approximately parallel members C C. The ends of these members are bent to form the extensions $e'$ and $e^2$. These extensions are formed with serrated edges $i$ and $i'$. All the serrations on one edge bend one way and the serrations on the other edge in the contrary direction, so that the teeth forming the serrations will be easily forced into engagement, but being once interlocked cannot be drawn out of engagement. This loop C C' is thinned a little at $e$ and $e$ to give it the proper resilience.

To use my invention, the end of the parallel members C C next to the bend C' are placed in the eye $B^2$ of the hatchet, so that the bend C' will rest on the outer edge of said eye and the said members will reach through and beyond the inner edge of said eye. The handle is then put in so that the ends of the extensions $e'$ and $e^2$ and a part of the parallel members C C will engage the groove $a$. The handle is then driven home. The parts should be so proportioned that when the handle is so forced home the ends of the extensions $e'$ $e^2$ will register with the hole $a$ on opposite sides. The extensions $e'$ and $e^2$ are then driven from opposite sides into the hole $a$, so that their serrated edges will interlock in the hole. These extensions should be of such length that when they are driven home the members C C will neatly fill the grooves $a'$. Then with the bend $C'$ engaging the outer edge of the eye $B^2$, the members C and C engaging the grooves $a'$, and the extensions $e'$ and $e^2$ engaging each other in the hole $a$ it will be found that the handle will be so securely held in place that some part of the mechanism must be broken before it can be withdrawn. It will also be observed that on account of the resilience of the parts $e$ of the loop the ends of the extensions $e'$ $e^2$ can be parted wide enough to engage the grooves $a'$, as before described, while the handle is being put in.

It is evident that this device with slight variations may be successfully applied to any tool of the character hereinbefore described. I do not, therefore, confine myself strictly to the construction and arrangement herein set forth, but reserve the right to make such slight variations as may be required by other tools without departing from the scope and spirit of my said invention.

Having now described my invention, what I claim as new, and desire to secure by Letters Patent, is—

1. The combination with the eye and handle of a hatchet, of a loop of resilient material having approximately parallel sides, with an oval bend at one end uniting said sides, and having the other end of said sides bent with extensions at right angles thereto, and arranged so that when said oval bend engages the edge of said eye, the said extensions can be clamped in said handle to prevent the withdrawal thereof from said eye.

2. The combination with the eye of a hatchet, and the handle thereof having longitudinal grooves and a transverse hole, of a loop of resilient material having approximately parallel sides, with an oval bend at one end uniting said sides, and having the other end of said sides bent with extensions at right angles thereto, and arranged so that when said oval bend engages the edge of said eye the said extensions can be clamped in said hole in the said handle, to prevent the withdrawal thereof from said eye.

3. The combination with the eye of a hatchet, and the handle thereof, having parallel grooves, on opposite sides thereof, and a hole extending through said handle at right angles to the axis thereof and communicating with said grooves, of a loop of resilient material, having approximately parallel sides, with an oval bend at one end uniting said sides, thinned in the middle parts of said sides to add greater resilience thereto, bent at their other end with extensions at right angles thereto, extending inwardly in said loop, formed with serrated edges and arranged so that when said oval bend engages the edge of said eye, the said extensions can be forced into said hole in said handle, and the said parallel sides of said loop resting in the said grooves in said handle, and the serrated edges of said extensions interlocking each other in said hole, will effectually prevent the withdrawal of said handle from said eye.

In testimony that I claim the foregoing as my invention I have signed my name, in presence of two witnesses, this 25th day of November, 1902.

JAMES FREDERICK McCULLUM.

Witnesses:
B. PATTERSON,
D. W. HAYNES.